United States Patent
Shimada et al.

(10) Patent No.: US 6,408,122 B1
(45) Date of Patent: Jun. 18, 2002

(54) PROBE FOR IRRADIATING WITH OR DETECTING LIGHT AND METHOD FOR MANUFACTURING THE SAME

(75) Inventors: Yasuhiro Shimada, Hadano; Ryo Kuroda, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 09/689,685

(22) Filed: Oct. 13, 2000

(30) Foreign Application Priority Data

Oct. 14, 1999 (JP) .......................................... 11-292859

(51) Int. Cl.[7] .............................. G02B 6/10; G02B 6/00; G02B 6/12; G01N 23/00
(52) U.S. Cl. ........................ 385/129; 385/12; 385/14; 385/130; 250/306
(58) Field of Search ............................ 385/12, 13, 15, 385/31, 38, 39, 43, 123, 125, 133, 147, 14

(56) References Cited

U.S. PATENT DOCUMENTS

| 5,354,985 A | * | 10/1994 | Quate .......................... 250/234 |
| 5,546,375 A | * | 8/1996 | Shimada et al. ............. 369/126 |
| 5,677,978 A | | 10/1997 | Lewis et al. ................. 385/147 |

FOREIGN PATENT DOCUMENTS

| EP | 0112402 | | 7/1984 | ............. G11B/7/12 |
| EP | 0786642 A1 | * | 7/1997 | ............. G01B/7/34 |
| EP | 0860726 | | 8/1998 | ............. G02B/21/00 |
| JP | 10 293134 | | 11/1998 | .......... G01N/37/00 |
| JP | 11 064350 | | 3/1999 | .......... G01N/37/00 |
| JP | 11 066650 | | 3/1999 | ............. G11B/9/00 |
| JP | 11 127412 | | 5/1999 | .......... H04N/5/765 |

OTHER PUBLICATIONS

Reddick et al., "New form of scanning optical microscpoy", Phys. Review B, vol. 39, No. 1, Jan. 1989, pp. 767–770.

Binning et al., "Surface studies by Scanning Tunneling Microscopy", Phys. Review Letters, vol. 49, No. 1, Jul. 1987, pp. 57–61.

Dürig et al., "Near-field optical-scanning microscopy", J. Appl. Phys., vol. 59, No. 10, May 1986, pp. 3318–3327.

* cited by examiner

Primary Examiner—Brian Healy
Assistant Examiner—Kevin S Wood
(74) Attorney, Agent, or Firm—Fitzpatrick, Cella, Harper & Scinto

(57) ABSTRACT

A method for manufacturing a probe for irradiating with or detecting light is disclosed, which is possible by a batch process with high productivity, has the high process reproducibility of optical micro-apertures, facilitates integration and down sizing, enables a plurality of probes to be fabricated easily, enables fabrication on compound semiconductor substrates, does not need coupling light between a wave guide layer and an optical micro-aperture, and minimize the transmission loss of light; and a probe for irradiating with or detecting light. The method comprises the steps of: (a) forming at least one recession on a first substrate; (b) fabricating a probe structure that contains a wave guide layer on the first substrate with the above recession; (c) bonding the probe structure on a second substrate; (d) transferring the probe structure that has a protrusion onto the second substrate, by peeling the probe structure off the first substrate; and (e) forming a cantilever-type probe that has a protrusion on a free end thereof by removing a part of the second substrate.

60 Claims, 11 Drawing Sheets

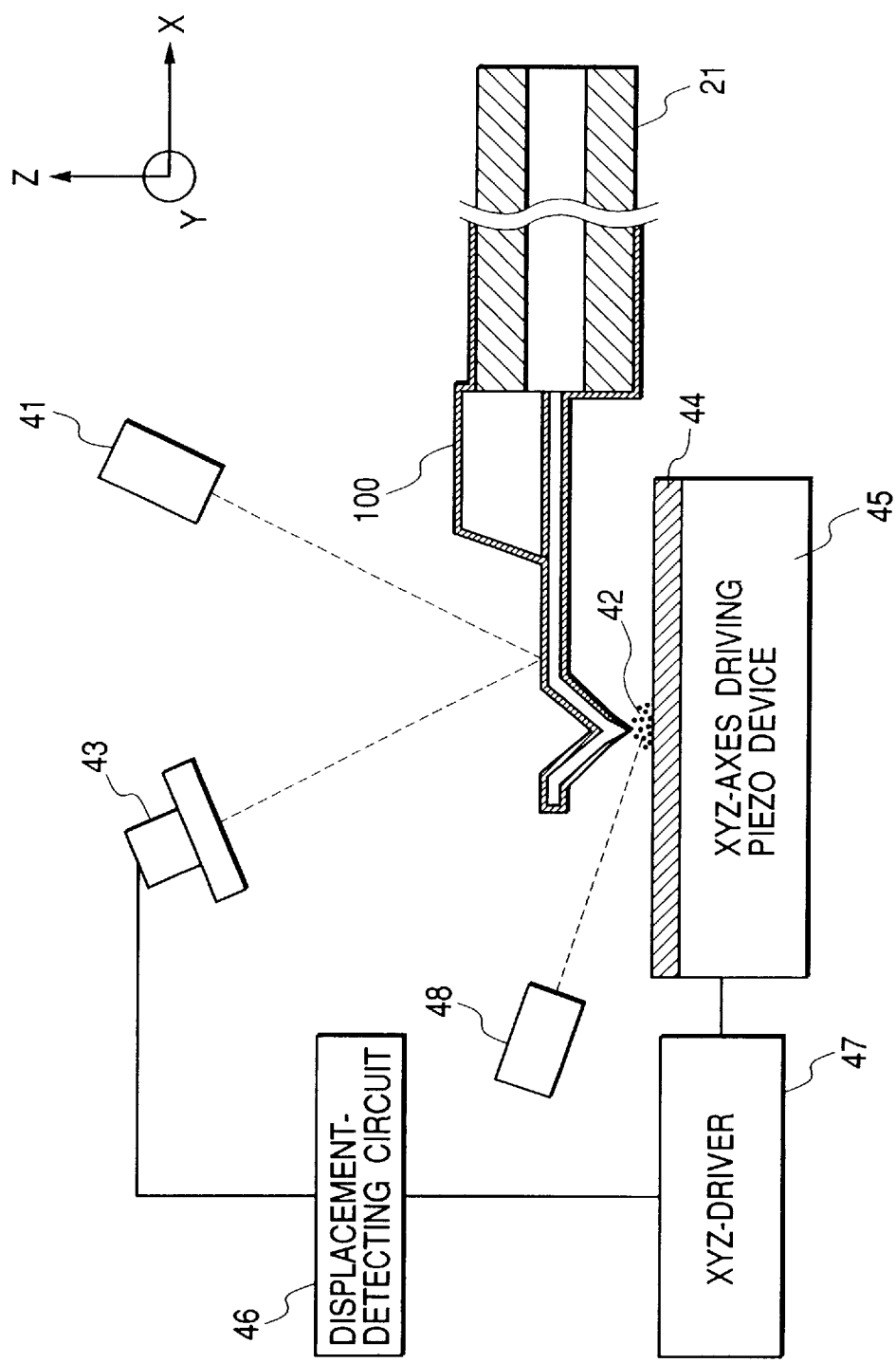

PROBE FOR IRRADIATING WITH OR DETECTING LIGHT AND METHOD FOR MANUFACTURING THE SAME

BACKGROUND OF THE INVENTION

1. Field of the Invention

The present invention relates to a method for manufacturing a probe for irradiating with or detecting light and to such a probe. More specifically the present invention relates to a method for manufacturing a probe for irradiating with or detecting evanescent light that is used especially in near-field optical microscopes and the like, and to such a probe and to a surface-observing apparatus having the probe.

2. Related Background Art

Since a scanning tunnel microscope (hereafter called "STM"), which can directly observe an electron structure of surface atoms of a conductor, has been developed (G. Binning et al., Phys. Rev. Lett, 49, 57 (1982)), and actual space images can be measured at high resolution whether single crystalline or amorphous, a scanning probe microscope (hereafter called "SPM") has been studied hard in the field of evaluating the microstructure of materials. SPMs include a scanning tunnel microscope (STM), an atomic force microscope (AFM), and magnetic force microscope (MFM), which detect surface structures using tunnel current, atomic force, magnetic force, light and so forth obtained by approaching a probe having a micro-tip to a sample to be evaluated. As a developed type of STM, a scanning near-field optical microscope (hereafter abbreviated as SNOM), which detects evanescent light oozing out from an optical micro-aperture on the tip of a sharp probe using an optical probe to study the surface of a sample, has been developed (Durig et al., Appl. Phys., 59, 3318 (1986)).

Furthermore, one type of SNOMs, Photon STM, to observe the surface of a sample by making an incident light from the back of the sample through a prism under a total-reflection condition come through the sample and detecting the evanescent light coming out to the surface of the sample with an optical probe, has also been developed (Reddick et al., Phys. Rev. B39, 767 (1989)).

Optical probes used in the above-described near-field optical microscopes include one using an optical fiber with a sharpened end to which an optical micro-aperture is provided, and another using a tip for irradiating with or detecting light fixed to the free end of a cantilever to impart the function as an AFM.

As such a cantilever-type probe, one having at the tip of a protrusion an optical micro-aperture formed by processing the end of an optical fiber, and imparting the function of bending as a cantilever to the optical fiber, has been disclosed (U.S. Pat. No. 5,677,978). However, in the methods using optical fibers, productivity is low, because probes must be processed one after the other, and it is difficult to make the same shape. Therefore, a method for fabricating a probe, in which a light-permeating protrusion formed on a first substrate is transferred onto a wave guide layer formed on a second substrate, a light-shielding layer is formed over the surface of the protrusion, and an optical micro-aperture is formed on the tip of the light-shielding layer (Japanese Patent Application Laid-Open No. 10-293134). Since this method is a batch process, the productivity of probes is high, and the process reproducibility of the optical micro-apertures is high. Also, the integration and down sizing of the probes are easy, and a plurality of probes can be fabricated easily. Furthermore, the method is advantageous in that the transferring of the protrusion to a compound semiconductor substrate enables the probe to be coupled easily with a semiconductor laser.

However, in the probe disclosed in Japanese Patent Application Laid-Open No. 10-293134, since the protrusion having an optical micro-aperture and the wave guide layer are fabricated separately and are optically coupled in the following process step, the process for forming such an optical coupling portion between the wave guide layer and the optical micro-aperture is complicated, and the transmission efficiency of light in the coupling portion is more or less poor.

SUMMARY OF THE INVENTION

Therefore, the object of the present invention is to solve the above-described problems, and to provide a method for manufacturing a probe for irradiating with or detecting light, which is possible by a batch process with high productivity, has the high process reproducibility of optical micro-apertures, facilitates integration and down sizing, enables a plurality of probes to be fabricated easily, enables fabrication on compound semiconductor substrates, does not need any optical coupling portion between a wave guide layer and an optical micro-aperture, and minimizes the transmission loss of light; and a probe for irradiating with or detecting light; and a surface-observing apparatus having the probe.

The above and other objects are achieved by:

a method for manufacturing a cantilever-type probe for irradiating with or detecting light having a protrusion that has an optical micro-aperture and a wave guide layer, which comprises the steps of forming the protrusion and the wave guide layer integrally on one substrate, and transferring the integrally formed protrusion and wave guide layer to another substrate;

a method for manufacturing a probe for irradiating with or detecting light, which comprises the steps of:

(a) forming at least one recession on a first substrate;

(b) fabricating a probe structure that contains a wave guide layer on the first substrate with the above recession;

(c) bonding the probe structure on a second substrate;

(d) transferring the probe structure that has a protrusion onto the second substrate, by peeling the probe structure off the first substrate; and (e) forming a cantilever-type probe that has a protrusion on a free end thereof by removing a part of the second substrate; and a cantilever-type probe for irradiating with or detecting light having a protrusion that has an optical micro-aperture and a wave guide layer manufactured by the above method for manufacturing the probe; and a surface-observing apparatus having the cantilever-type prove for irradiating with or detecting light.

BRIEF DESCRIPTION OF THE DRAWINGS

FIG. 12 is a block diagram of a surface-observing apparatus according to Embodiment 4 of the present invention.

DETAILED DESCRIPTION OF THE PREFERRED EMBODIMENTS

Figure 1A:
FIGS. 1A, 1B, 1C, 1D, 1E and 1F are sectional views showing the manufacturing process of a probe according to Embodiment 1 of the present invention.

The present invention relates to a method for manufacturing a cantilever-type probe for irradiating with or detecting light. The structure of the cantilever-type probe according to the manufacturing method of the present invention comprises a protrusion having an optical micro-aperture at a free end of the cantilever having an optical wave-guide. In the probe for irradiating with light, a sample is irradiated with light from the optical micro-aperture that has entered in the wave-guide from a light-emitting element or an optical fiber. In the probe for detecting light, light that has entered in the probe from the optical micro-aperture is propagated into the wave-guide, and detected through the light-receiving element and an optical fiber. The optical micro-aperture is made by forming an opening physically at the clad layer or the light-shielding layer that covers the wave guide layer at the tip region of the protrusion, or by thinly forming the light-shielding layer or the clad layer at the tip region of the protrusion.

A process for manufacturing a cantilever-type probe according to an embodiment of the present invention will be described below.

First, a recession that becomes the mold of the protrusion is formed on the surface of the first substrate. Typical methods for forming the recession include a method using crystal-anisotropic etching. In this method, a mask layer of silicon dioxide or silicon nitride formed on the surface of single-crystal silicon of crystal-face orientation (100) is patterned to form an etching opening, and the inverted pyramid-shaped recession is formed by the anisotropic etching using an aqueous solution of alkali such as potassium hydroxide and tetramethyl ammonium hydroxide. Besides this method, a mold of an inverted conical shape can be formed on a substrate using a converged ion beam. Also, a recession formed on a substrate by electroplating can be used as the mold for the protrusion (Japanese Patent Application No. 11-127412).

Second, a probe structure including a wave guide layer is formed on the first substrate that has the above recession. A material for the wave guide layer is selected from materials that transmit light well and can be used as the elastic body of the cantilever. Specifically, organic materials such as PMMA (polymethylmethacrylate), a photopolymer, polycarbonate, epoxies, and polyurethane, or inorganic materials such as zinc oxide, silicon nitride, silicon dioxide, glass, and phosphorous silicate glass can be used. A film of these materials can be formed by sputtering, vacuum evaporation, spin coating, dip coating and so forth.

An ordinary photolithographic method can be used for the patterning. The wave guide layer may comprise a single layer, or a core layer and a clad layer. The clad layer is formed from a light-permeable material of a refraction index smaller than that of the core layer. Also, the wave guide layer may be covered with a light-shielding layer. The use of a metal such as platinum, gold, silver, nickel and aluminum is preferable for the light-shielding layer. The light-shielding layer may also be a multi-layer film such as a laminated film of platinum and gold. The light-shielding layer may be formed on the first substrate as a part of the probe structure containing the wave guide layer, or may be formed so as to cover the wave guide layer after transferring the wave guide layer on a second substrate described below. Vacuum evaporation, sputtering, chemical gas-phase growth and so forth can be used for forming the light-shielding layer. An ordinary photolithographic method can be used for patterning the light-shielding layer.

Third, the above probe structure is bonded on the second substrate, and the first substrate is separated from the probe structure to transfer the probe structure, which has a protrusion, onto the second substrate. In the present invention, in order to transfer the shape of the probe structure including the protrusion onto the second substrate as it is, the first substrate side of the probe structure must be formed so as to separate easily, and the second substrate side of the probe structure must be formed so as to bond tightly. The method to make the second substrate side of the probe structure bond tightly can be, for example, a method to form a gold film on the side of the second substrate, to form on the second substrate a bonding layer having a surface composed of gold, and to align and load these to bond them with metallic bond.

Also, a coupling agent may be applied to the second substrate side of the probe structure or onto the second substrate. As an example of methods to make the first substrate side separate easily, a method can be used in which a thermally oxidized silicon dioxide layer is formed on the surface of the first substrate comprised of silicon to use it as a separating layer, a gold film is formed on the separating layer as a light-shielding layer, on which a probe structure is formed to facilitate a separation at the interface between the separating layer and the light-shielding layer. A method, in which a releasing agent is applied to the first substrate, on which a probe structure is formed, can also be used.

Fourth, an optical micro-aperture is formed on the light-shielding layer on the tip region of the protrusion. Methods to form the optical micro-aperture include a method in which the part of the light-shielding layer that becomes the tip region of the protrusion is thinned, or the light-shielding layer is not formed on the tip region of the protrusion, when the light-shielding layer is formed on the first substrate. This method is disclosed in Japanese Patent Application Laid-Open No. 11-066650.

Also, after transferring the probe structure onto the second substrate, the light-shielding layer on the tip region of the protrusion may be removed selectively. For example, after a film thickness-adjusting layer that is especially thin on the tip region of the protrusion is formed on the surface of the light-shielding layer, the film thickness-adjusting layer and the light-shielding layer are sequentially etched to form an optical micro-aperture. The method to form an optical micro-aperture using the film thickness-adjusting layer is disclosed in Japanese Patent Application Laid-Open No. 11-064350. By the combination of the above two methods, optical micro-apertures can be formed more easily with high reproducibility regarding shape. Another method to form the optical micro-aperture that can be used is to remove the light-shielding layer by forcing the light-shielding layer on the tip region of the protrusion against a hard surface (European Patent No. 112402).

Fifth, the cantilever-type probe having a protrusion on the free end is formed by removing a part of the second substrate. For example, mask layers are formed on the top surface and the bottom surface of the second substrate, an etching opening is formed by patterning the mask layer on the bottom surface, and a part of the second substrate is etched off by etching the second substrate through the etching opening to form a cantilever. Specifically, it is preferable to use a single crystal silicon of face orientation (100) as the second substrate, and to use crystal-anisotropic etching. Dry etching using high-density plasma is also effective.

Sixth, the optical coupling portion is formed to couple the wave guide layer optically to the external wave guide such as an optical fiber or to a light receiving/emitting element. Most simply, a part of the second substrate side of the wave guide layer is exposed. For example, the wave guide layer is cut together with the second substrate with a diamond cutter or by cleavage to form an end surface in the wave guide layer. An optical fiber or a light receiving/emitting element may be coupled directly to the end surface, or may be coupled optically through a lens or the like. Alternatively, a part of the light-shielding layer covering the wave guide layer is removed by etching or the like to form an exposed surface. The exposed surface may be formed on the side opposite to the second substrate of the wave guide layer, or may be formed on the second substrate side (coupling side). When it is formed on the second substrate side, a through hole is formed for introducing light. In order to introduce light, a prism may be bonded on the exposed surface, and light is introduced into the wave guide layer through the prism. Furthermore, a light coupler for scattering or diffraction of light may be formed on or in the vicinity of the exposed surface. For example, light may be introduced through a diffraction grating produced by patterning the light-shielding layer. Also, a structure for scattering incident light into the wave guide layer may be fabricated.

The manufacturing method according to the present invention can also be used for forming a plurality of probes simultaneously on a substrate, thereby raising productivity. The method can also be used for forming a multi-probe chip having a plurality of probes. The probe manufactured by the method of the present invention can also be used by bonding with a member having a wave guide such as an optical fiber. For example, light from an optical fiber can be introduced into the probe by connecting the optical fiber to the wave guide layer of the probe according to the present invention. Light detected by the probe may also be introduced into an optical fiber. The probe according to the present invention may also be used in a manner of being bonded with a light-emitting element, a light-receiving element or a light-emitting/receiving element, whereby near-field light-receiving/emitting elements is enabled to be constituted compactly.

Since the probe according to the present invention has a cantilever structure, it can be used as a probe in an atomic-force microscope (AFM) by detecting the distortion of the cantilever. A method in which the surface of the cantilever is irradiated with a laser beam and the direction of the reflected beam is sensed is generally used as the method for detecting distortion. The probe according to the present invention may also be provided with a means for detecting the distortion of the cantilever within the probe itself. For example, the probe of the present invention can be transferred onto a piezo-resistor for detecting distortion formed on an SOI (silicon on insulator) substrate to fabricate a probe for irradiating with or detecting light having the piezo-resistor.

The embodiments of the present invention will be described below.

Embodiment 1

FIGS. 1A through 1F and 2A through 2F are sectional views showing a process for manufacturing a probe according to Embodiment 1 of the present invention. The method for manufacturing this embodiment will be described below referring to these drawings.

First, a single-crystal silicon wafer of face orientation (100) was provided as a first substrate 1, on which a thermally oxidized silicon film 200 nm thick was formed as a mask layer 2. Next, a desired portion of the protective layer on the surface was patterned by photolithography and etching with an aqueous solution of hydrogen fluoride and ammonium fluoride to expose a part of silicon (see FIG. 1A).

Next, silicon at the patterned portion was etched by crystal-anisotropic etching using a 30% aqueous solution of potassium hydroxide at a solution temperature of 90° C. By this step, an inverted-pyramid-shaped recession 3 of a depth of about 7 $\mu$m surrounded by four faces equivalent to (111) face was formed. Next, the mask layer 2 was removed by an aqueous solution of hydrogen fluoride and ammonium fluoride.

Figure 1B:
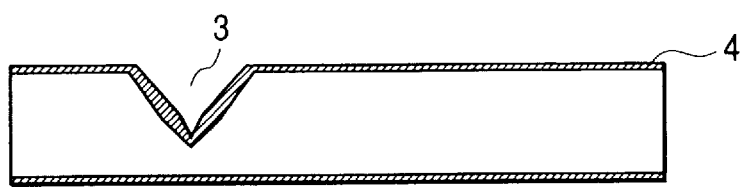

Next, a thermally oxidized silicon film 400 nm thick was formed as a separating layer 4 (see FIG. 1B).

Figure 1C:
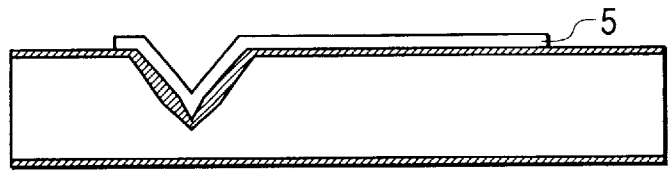
Figure 1D:
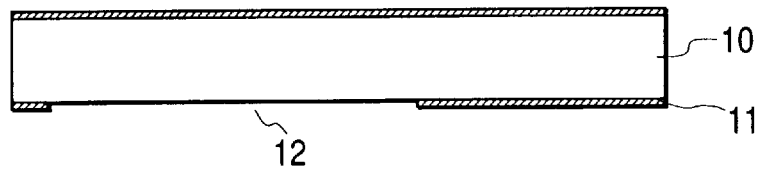

After a fluorine-based releasing agent was applied to the separating layer 4, a wave guide layer 5 3 $\mu$m thick was applied by spin coating, and was patterned using a photolithographic method (see FIG. 1C).

Next, a single-crystal silicon wafer of face orientation (100) was provided as a second substrate 10, on which a thermally oxidized silicon film 200 nm thick was formed as a mask layer 11. Next, a desired portion of the bottom surface of the mask layer 11 was patterned by photolithography and etching with an aqueous solution of hydrogen fluoride and ammonium fluoride to form an etching opening 12 (see FIG. 1D).

Figure 1E:
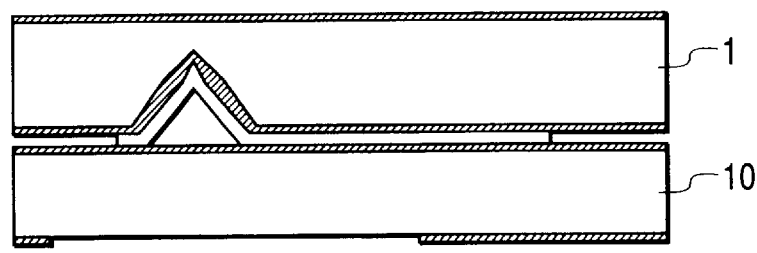

Next, after a coupling agent having amino group was applied to the top surface of the second substrate 10, the first substrate 1 was aligned and bonded to the second substrate 10 (see FIG. 1E).

Figure 1F:
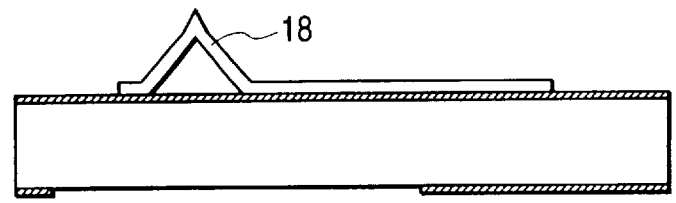

Next, by separating the first substrate 1 from the second substrate 10 at the interface between the separating layer 4 and the wave guide layer 5, a probe structure comprising the wave guide layer 5 was transferred onto the second substrate 10 (see FIG. 1F).

At this time, the portion corresponding to the recession of the probe structure became a protrusion 18 of a height of about 7 $\mu$m. Next, a part of the second substrate 10 was etched off through the etching opening 12 using an aqueous solution of tetramethylammonium hydroxide heated to 90° C. (see FIG. 2A).

Figure 2A:
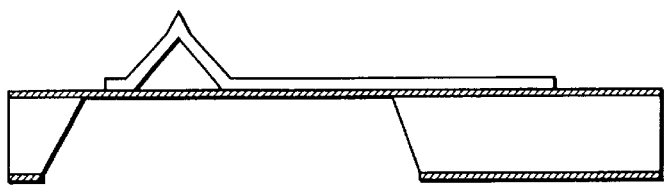
FIGS. 2A, 2B, 2C, 2D, 2E and 2F are sectional views showing the manufacturing process of a probe according to Embodiment 1 of the present invention.
Figure 2B:
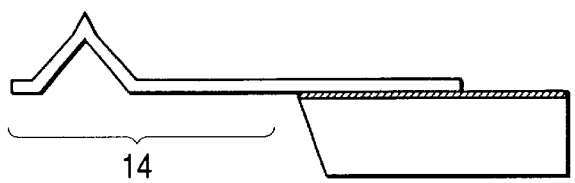

Next, the mask layer 11 was removed using a mixed aqueous solution of hydrogen fluoride and ammonium fluoride to form a cantilever 14 (see FIG. 2B). The cantilever 14 had a length of 1 mm, and a spring constant of 0.1 N/m.

Figure 2C:
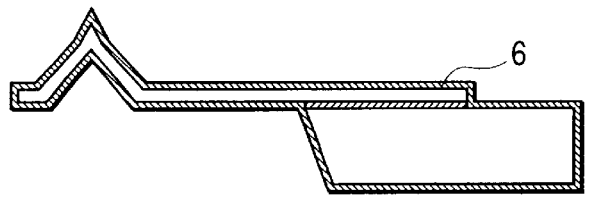
Figure 2D:
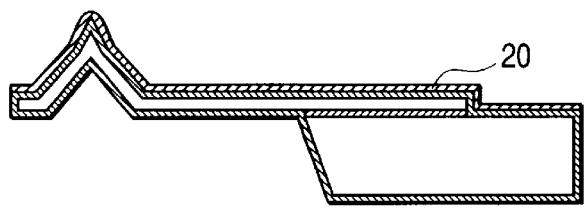
Figure 2E:
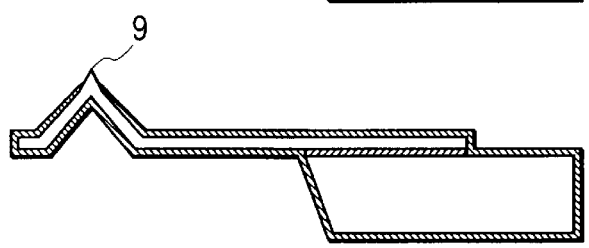

Next, aluminum films 100 nm thick were formed on the top and bottom surfaces of the wave guide layer 5 using vacuum evaporation (see FIG. 2C). Next, a film of PSG (phosphorous silicate glass) 100 nm thick was formed as a film-thickness adjusting layer 20 on the surface of the light-shielding layer 6 by a chemical vapor-phase growth (see FIG. 2D). Next, each part of the film-thickness adjusting layer 20 and the light-shielding layer 6 was etched off by dry etching using argon gas to form an optical micro-aperture 9 (see FIG. 2E).

A method for forming an optical micro-aperture 9 thus using a film-thickness adjusting layer 20 is disclosed in Japanese Patent Application Laid-Open No. 11-064350.

Figure 2F:
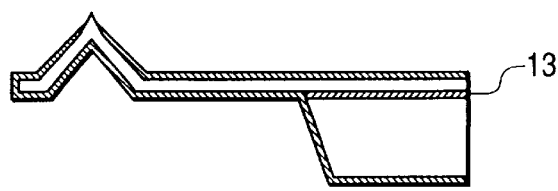

Finally, the second substrate 10 was cut with a diamond cutter to form an end 13 of the wave-guide (see FIG. 2F).

Although the process for manufacturing one probe was described above, a plurality of probes can be formed simultaneously on a substrate, thereby raising productivity. A multi-probe chip having a plurality of probes can also be formed.

Figure 3A:
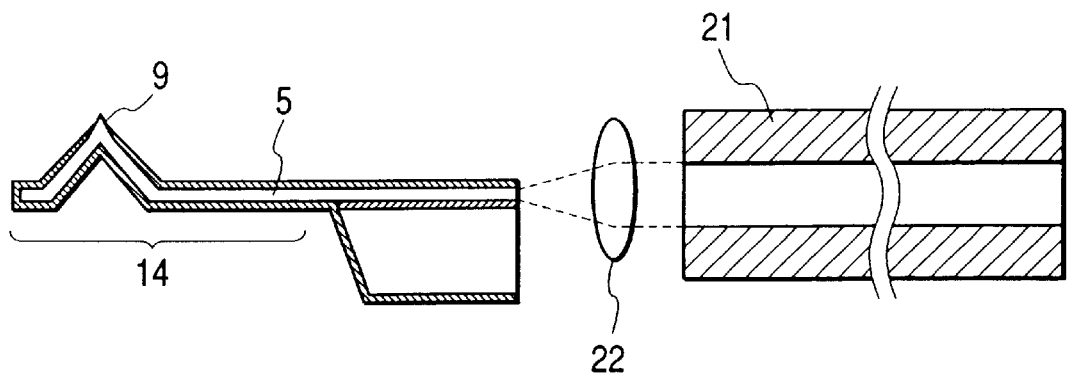
FIGS. 3A and 3B are diagrams showing the connection of a probe according to Embodiment 1 of the present invention and an optical fiber.
Figure 3B:
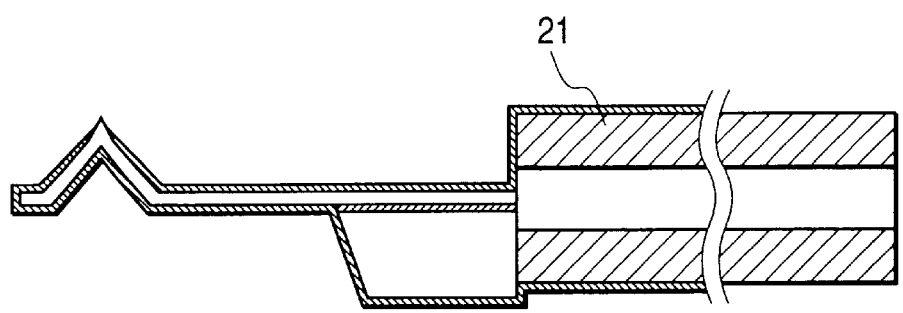

FIGS. 3A and 3B are diagrams showing an optical probe connected to an optical fiber according to this embodiment. In FIG. 3A, a condenser lens 22 is provided between the end 13 of the wave-guide and the optical fiber 21. In this case, light from the end of the optical fiber 21 is converged by the condenser lens 22, and enters into the wave guide layer 5 through the end 13 of the wave-guide. In FIG. 3B, the end of the optical fiber 21 is bonded to the end 13 of the wave-guide with an epoxy-based adhesive. By this structure, light from the end of the optical fiber 21 enters directly into the wave guide layer 5. For bonding the optical fiber 21 to the end 13 of the wave-guide, organic materials other than the epoxy-based adhesive such as PMMA, a photopolymer, polycarbonate and polyurethane may be used. After bonding the end of the optical fiber to the end of the waver-guide, an aluminum 100 nm thick was deposited on the vicinity of the bonding portion by vacuum evaporation to form a coat for preventing the light breaking through the difference in shape of the ends.

Figure 4:
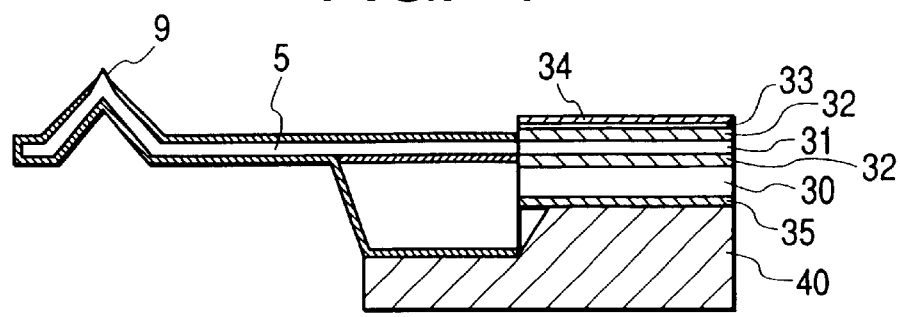
FIG. 4 is a diagram showing the connection of a probe according to Embodiment 1 of the present invention and an end light-emitting laser.

The optical probe according to this embodiment can also be connected with an end light-emitting element or an end light-receiving element. FIG. 4 is a diagram showing an example of an optical probe connected to an end light-emitting laser. The end light-emitting laser, was formed by laminating an active layer 31, clad layers 32, a capping layer 33, an anode 34, and a cathode 35 on a single-crystal gallium arsenide substrate 30. The second substrate 10 and the gallium arsenide substrate 30 were bonded on an auxiliary substrate 40 having difference in level by aligning the end surface of the active layer 31 and the end surface 13 of the wave-guide. The end surface of the active layer 31 was produced by cleavage. When a voltage is impressed between the anode 34 and the cathode 35, laser beams generated in the active layer 31 are released from the end surface of the active layer 31, and enter into the wave guide layer 5. Although an example of an end light-emitting element is shown in FIG. 4, a structure in an end light-receiving element such as a photodiode can be used similarly.

Although the process for manufacturing one probe was described above, a plurality of probes can be formed simultaneously on a substrate, thereby raising productivity. A multi-probe chip having a plurality of probes can also be formed.

According to this embodiment, there is provided a method for manufacturing an optical probe, in which productivity is high because of a batch process, the process reproducibility of optical micro-apertures is high, integration and down sizing are easily achieved and a plurality of probes was easily fabricated. There was also provided an optical probe that did not required a optical coupling portion between the wave guide layer and the optical micro-aperture, and had little transmission loss of light.

Embodiment 2

FIGS. 5A through 5E and 6A through 6F are sectional views showing a process for manufacturing a probe according to Embodiment 2 of the present invention. The method for manufacturing this embodiment will be described below referring to these drawings.

First, a single-crystal silicon wafer of face orientation (100) was provided as a first substrate 1, on which a thermally oxidized silicon film 200 nm thick was formed as a mask layer 2. Next, a desired portion of the surface protective layer was patterned by photolithography and etching with an aqueous solution of hydrogen fluoride and ammonium fluoride to expose a part of silicon (see FIG. 5A).

Next, silicon at the patterned portion was etched by anisotropic etching using a 30% aqueous solution of potassium hydroxide at a solution temperature of 90° C. By this step, an inverted-pyramid-shaped recession 3 of a depth of about 7 $\mu$m, and a plurality of V-grooves 15 of a depth of 1 $\mu$m and a pitch of 2 $\mu$m were formed. Next, the mask layer 2 was removed by an aqueous solution of hydrogen fluoride and ammonium fluoride. Next, a thermally oxidized silicon film 400 nm thick was formed as a separating layer 4 (see FIG. 5B).

Figure 5A:
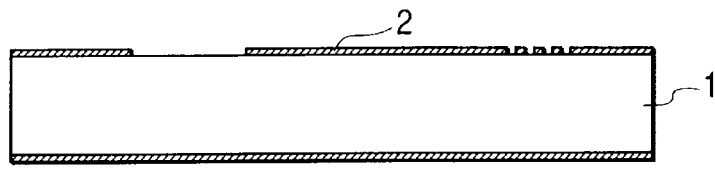
FIGS. 5A, 5B, 5C, 5D and 5E are sectional views showing the manufacturing process of a probe according to Embodiment 2 of the present invention.
Figure 5B:
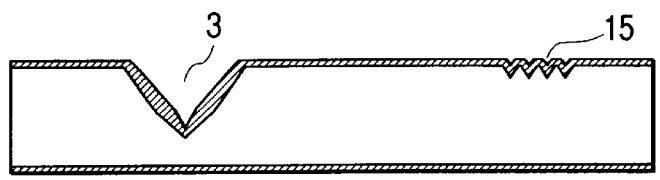
Figure 5C:
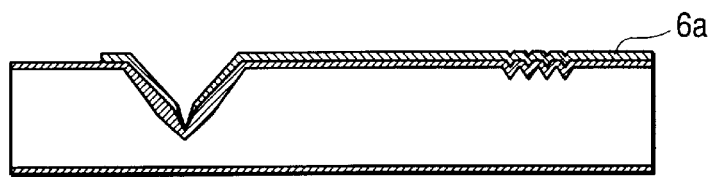

Next, a gold layer 100 nm thick and a platinum layer 100 nm thick were deposited on the separating layer 4 as a light-shielding layer A 6a (see FIG. 5C). In this case the incident angle of the sputtered particles on the first substrate 1 was adjusted so that the light-shielding layer A 6a was thinned at the tip of the recession 3.

Figure 5D:
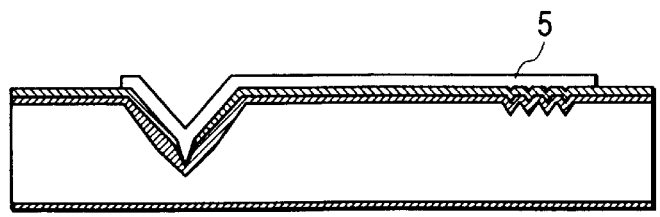

Next, a film of PSG (phosphorous silicate glass) 1 $\mu$m thick was formed as a wave guide layer 5 by a chemical vapor-phase growth, and the wave guide layer 5 was patterned using a photolithography and dry etching (see FIG. 5D).

Figure 5E:
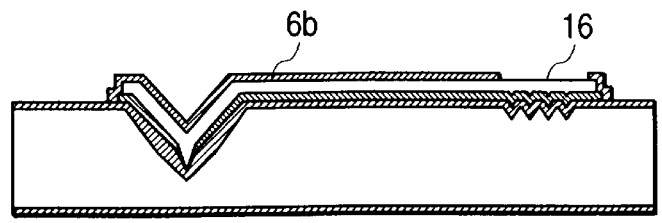

Next, a platinum layer 100 nm thick and a gold layer 100 nm thick were deposited by sputtering as a light-shielding layer B 6b, and the light-shielding layer A 6a and the light-shielding layer B 6b were patterned using a photolithography and dry etching (see FIG. 5E). In this case a part of the light-shielding layer B 6b on the wave guide layer 5 was removed to form an exposed surface 16 of the waveguide.

Next, a single-crystal silicon wafer of face orientation (100) was provided as a second substrate 10, on which a thermally oxidized silicon film 200 nm thick was formed as a mask layer 11.

Next, a desired portion of the bottom surface of the mask layer 11 was patterned by photolithography and etching with an aqueous solution of hydrogen fluoride and ammonium fluoride to form an etching opening 12.

Figure 6A:
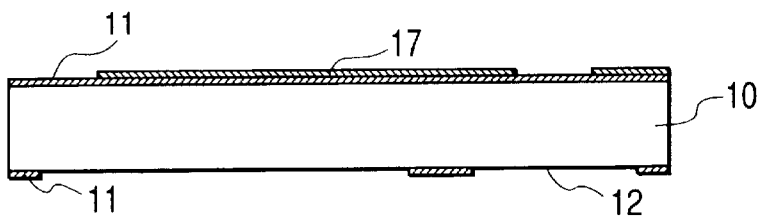
FIGS. 6A, 6B, 6C, 6D, 6E and 6F are sectional views showing the manufacturing process of a probe according to Embodiment 2 of the present invention.

Next, a titanium layer 5 nm thick and a gold layer 100 nm thick were formed by sputtering on the surface of the second substrate 10, and patterned by photolithography and wet etching to form a bonding layer 17 (see FIG. 6A).

Figure 6B:
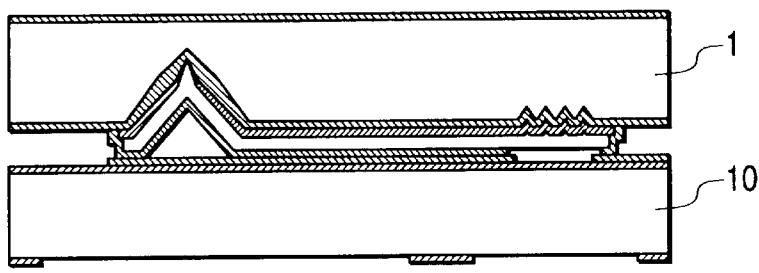

Next, the first substrate 1 was aligned and bonded to the second substrate 10 (see FIG. 6B). At this time, a metallic bond was formed between the gold of the bonding layer 17 and the gold of the light-shielding layer B 6b.

Figure 6C:
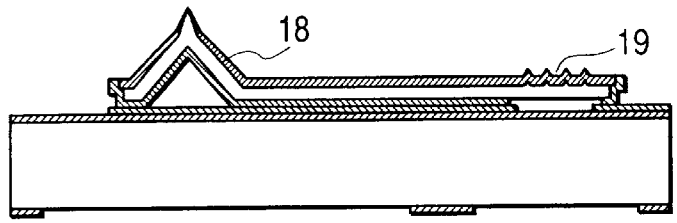

Next, by separating the first substrate 1 from the second substrate 10 at the interface between the separating layer 4 and the light-shielding layer A 6a, a probe structure comprising the light-shielding layer A 6a, the light-shielding layer B 6b, and the wave guide layer 5 was transferred onto the second substrate 10 (see FIG. 6C). In this case, since adhesion is poor at the interface between silicon dioxide of the separating layer 4 and gold of the light-shielding layer A 6a, the first substrate 1 can be separated easily. As a result, the portion of the probe structure corresponding to the recession became a protrusion 18 of a height of about 7 μm in the probe structure, and a light coupler 19 was formed in the portion corresponding to V-grooves 15 of the first substrate.

Figure 6D:
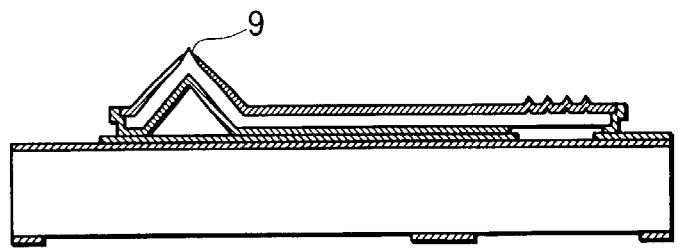
Figure 6E:
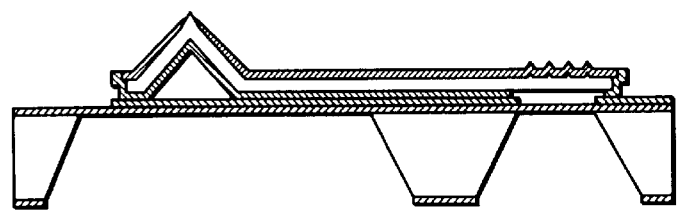

Next, after a film of PSG (phosphorous silicate glass) 100 nm thick was formed as a film-thickness adjusting layer 20 on the surface of the light-shielding layer A 6a by a chemical vapor-phase growth, each part of the film-thickness adjusting layer 20 and the light-shielding layer A 6a were etched off by dry etching using argon gas to form an optical micro-aperture 9 (see FIG. 6D). The method for forming an optical micro-aperture 9 thus using a film-thickness adjusting layer 20 is disclosed in Japanese Patent Application Laid-Open No. 11-064350. In this embodiment, the optical micro-aperture was formed more easily by making the light-shielding layer A 6a thin at the tip of the recession 3 as FIG. 5B shows. This method is disclosed in Japanese Patent Application Laid-Open No. 11-066650.

Next, a part of the second substrate 10 was etched off through the etching opening 12 using an aqueous solution of tetramethylammonium hydroxide heated to 90° C. (see FIG. 6E).

Figure 6F:
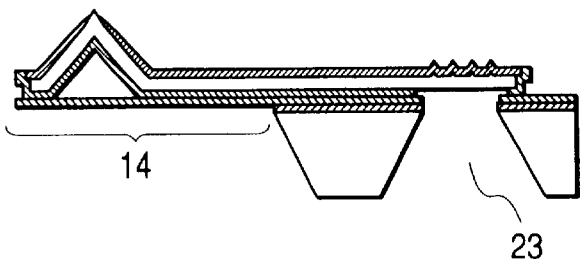

Finally, the mask layer 11 was removed using a mixed solution of hydrogen fluoride and ammonium fluoride to form a cantilever 14 and a through hole 23 (see FIG. 6F). The cantilever 14 had a length of 3 mm, and a spring constant of 0.1 N/m.

Figure 7A:
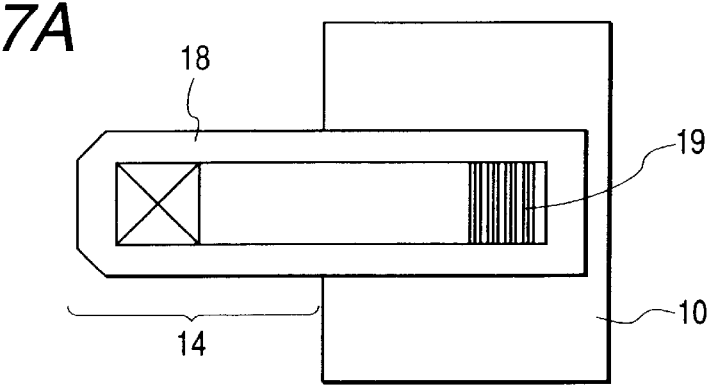
FIGS. 7A, 7B and 7C are diagrams showing the connection of a probe according to Embodiment 2 of the present invention and an optical fiber.
Figure 7B:
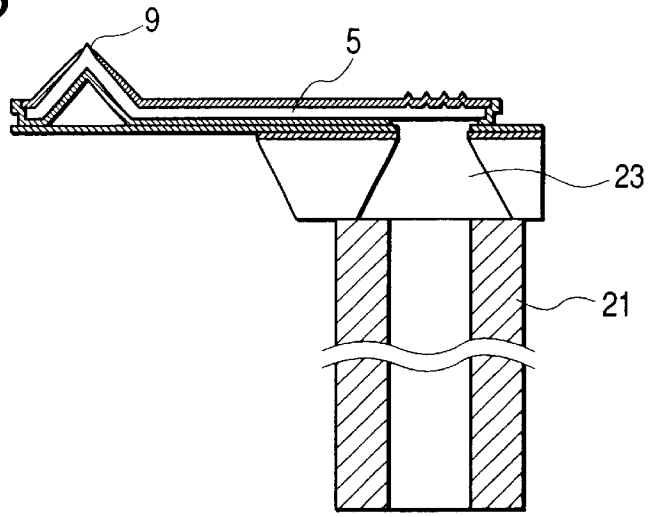
Figure 7C:
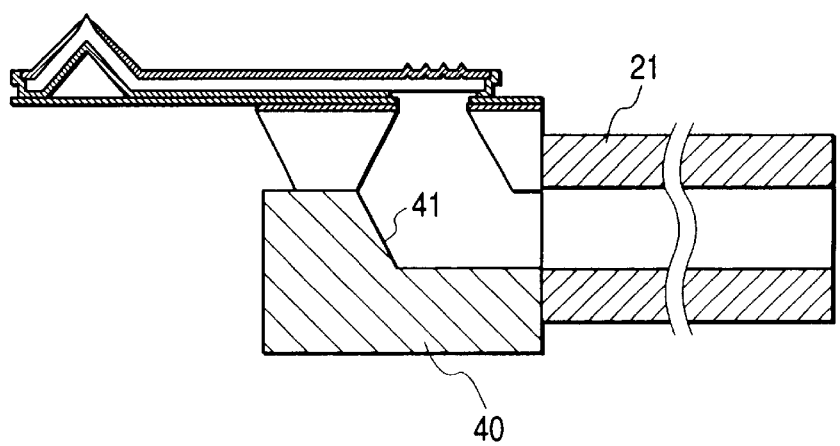

FIG. 7A is a plan of an optical probe according to this embodiment. FIGS. 7B and 7C are diagrams showing an optical probe according to this embodiment connected to an optical fiber 21. In FIG. 7B, light from the end of the optical fiber 21 is reflected by the light coupler 19 of the wave guide layer 5, and enters into the wave guide layer 5. In FIG. 7C, light from the end of the optical fiber 21 is once reflected by the mirror 41 of the auxiliary substrate 40, and further reflected by the light coupler 19 of the wave guide layer 5, and enters into the wave guide layer 5. A single-crystal silicon substrate of a face orientation (100) was used as the auxiliary substrate 40, and the mirror 41 was easily fabricated using crystal-anisotropic etching. Anodic bonding was used for bonding the second substrate 10 to the auxiliary substrate 40. An epoxy-based adhesive was used for bonding the second substrate 10 to the optical fiber 21.

Figure 8:
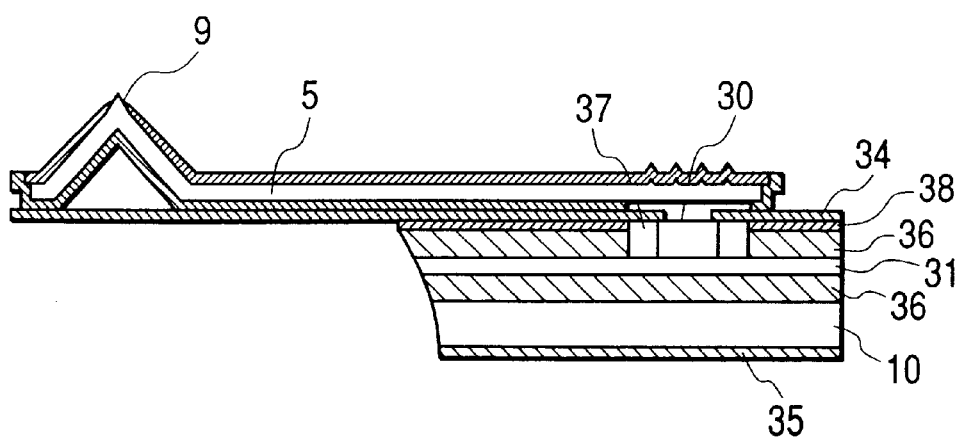
FIG. 8 is a diagram showing the connection of a probe according to Embodiment 2 of the present invention and a surface light-emitting laser.

The optical probe according to this embodiment is also easily connected with a substrate having a surface light-emitting element or a substrate having a surface light-receiving element. FIG. 8 is a diagram showing a method for connecting an optical probe according to this embodiment to a surface light-emitting laser. In the optical probe having a light-emitting element of FIG. 8, a substrate having a surface light-emitting laser was used as the second substrate 10 in the above-described embodiment to substitute a silicon substrate. The surface light-emitting laser was formed by preparing an active layer 31, a mirror layer 36, a polyimide portion 37, a silicon nitride portion 38, a light-emitting element 39, an anode 34, and a cathode 35 on a single-crystal gallium arsenide substrate. The anode 34 is connected to the light-emitting element 39 for driving the light-emitting element 39. The silicon nitride layer 38 is formed for insulating the anode 34. When a voltage is impressed between the anode 34 and the cathode 35, laser beams generated from the active layer 31 are reflected by upper and lower mirror layers 36, released from the upper opening, reflected by light coupler 19 of the wave-guide layer 5 and enter into the wave guide layer 5. For etching the single-crystal gallium arsenide substrate for forming the cantilever 14, an aqueous solution of ammonium hydroxide and hydrogen peroxide, and an aqueous solution of sulfuric acid and hydrogen peroxide was used. Although an example of surface light-emitting elements is shown in FIG. 8, the structure can be used similarly in a surface light-receiving element such as a photodiode.

Although the process for manufacturing one probe was described above, a plurality of probes can be formed simultaneously on a substrate, thereby raising productivity. A multi-probe chip having a plurality of probes can also be formed.

According to this embodiment, there is provided a method for manufacturing an optical probe, in which productivity is high because of a batch process, the process reproducibility of optical micro-apertures is high, integration and down sizing are easily achieved, and a plurality of probes are easily fabricated. Since the probe can be formed on a compound semiconductor substrate such as gallium arsenide, the probe can be bonded easily with a light-emitting element such as a semiconductor laser. Also, there is provided a structure that can transmit light incident perpendicularly to the wave guide layer to the optical micro-aperture efficiently. There is also provided an optical probe that does not required an optical coupling portion between the wave guide layer and the optical micro-aperture, and has little transmission loss of light.

Embodiment 3

FIGS. 9A through 9E and 10A through 10E are sectional views showing a process for manufacturing a probe according to Embodiment 3 of the present invention. The method for manufacturing this embodiment will be described below referring to these drawings.

Figure 9A:
FIGS. 9A, 9B, 9C, 9D and 9E are sectional views showing the manufacturing process of a probe according to Embodiment 3 of the present invention.

First, in the same manner as in Embodiment 1, a recession 3 of an inverted-pyramid shape of a depth of about 10 μm and a separating layer 4 comprised of a silicon thermal oxide layer 400 nm thick were formed on the surface of the first substrate 1 comprised of single-crystal silicon (see FIG. 9A).

Figure 9B:
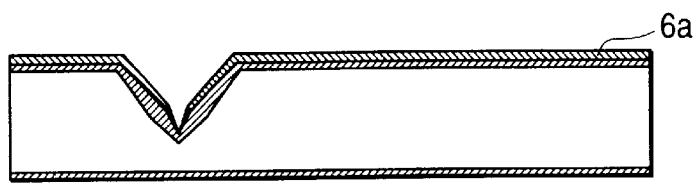
Figure 9C:
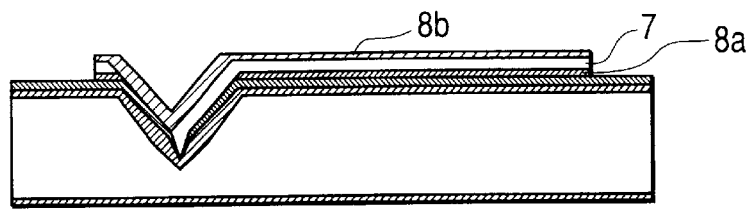

Next, a gold layer 100 nm thick was deposited on the separating layer 4 by sputtering as a light-shielding layer A 6a (see FIG. 9B). In this case, the incident angle of the sputtered particles on the first substrate 1 was adjusted so that the light-shielding layer A 6a was thinned at the tip of the recession 3.

Next, a silicon dioxide layer 100 nm thick was formed as a clad layer A 8a by sputtering. In this case, the incident angle of the sputtered particles on the first substrate 1 was adjusted so as not to deposit silicon dioxide on the recession 3. Next, a zinc oxide layer 1 μm thick was formed as a core layer 7 by sputtering. In this case, the incident angle of the sputtered particles on the first substrate 1 was adjusted so that zinc oxide was thickly deposited on a specific surface in the recession 3. Next, a silicon dioxide layer 100 nm thick was formed as a clad layer B 8b by sputtering. Next, the clad layer A 8a, the core layer 7, and the clad layer B 8b were patterned by photolithography and wet etching (see FIG. 9C).

Figure 9D:
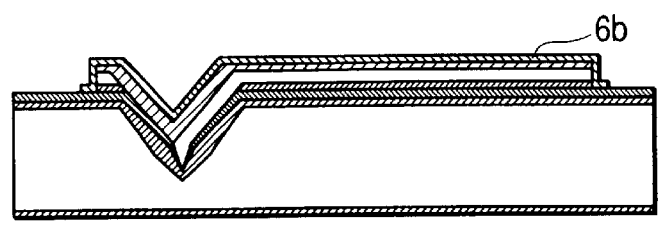

Next, after a gold layer 100 nm thick was deposited by sputtering as a light-shielding layer B 6b, the light-shielding layer A 6a and the light-shielding layer B 6b were patterned by photolithography and dry etching (see FIG. 9D).

Next, a single-crystal silicon wafer of face orientation (100) was provided as a second substrate 10, on which a thermally oxidized silicon film 200 nm thick was formed as a mask layer 11. Next, a desired portion of the mask layer 11 of the bottom surface was patterned by photolithography and etching with an aqueous solution of hydrogen fluoride and ammonium fluoride to form an etching opening 12 (see FIG. 9E).

Figure 9E:
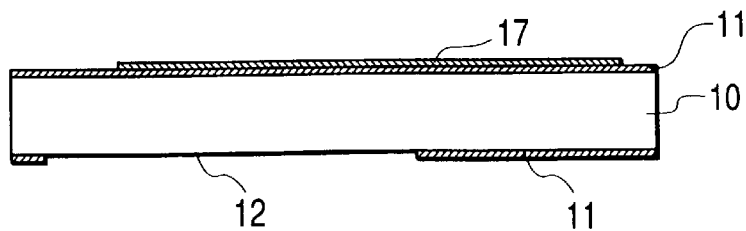

Next, a titanium layer 5 nm thick and a gold layer 100 nm thick were formed by sputtering on the surface of the second substrate 10, and patterned by photolithography and wet etching to form a bonding layer 17 (see FIG. 9E).

Figure 10A:
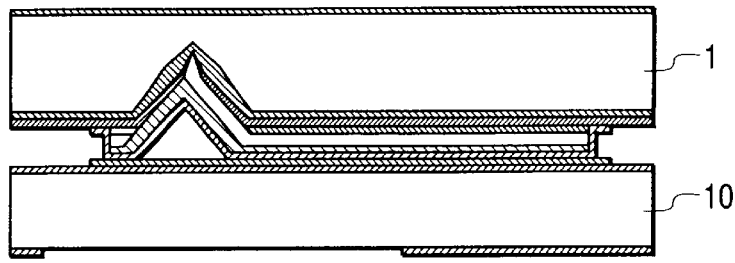
FIGS. 10A, 10B, 10C, 10D and 10E are sectional views showing the manufacturing process of a probe according to Embodiment 3 of the present invention.

Next, the first substrate 1 was aligned and bonded to the second substrate (see FIG. 10A). At this time, a metallic bond was formed between the gold of the bonding layer 17 and the gold of the light-shielding layer B 6b.

Figure 10B:
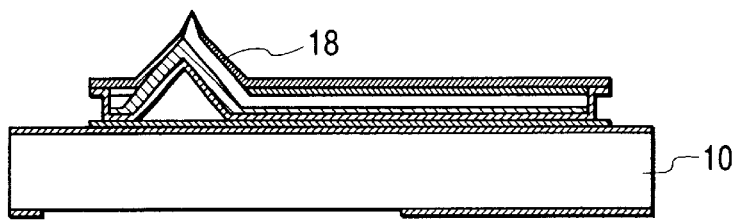
Figure 10C:
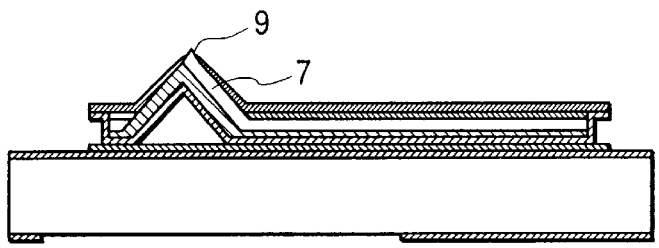
Figure 10D:
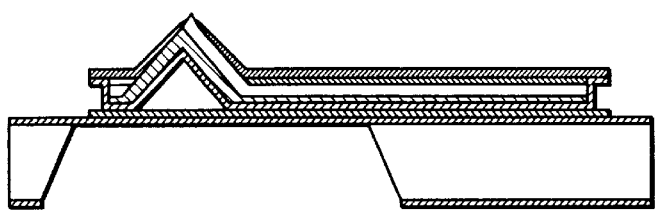
Figure 10E:
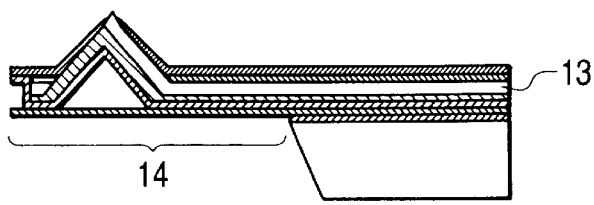
Figure 11A:
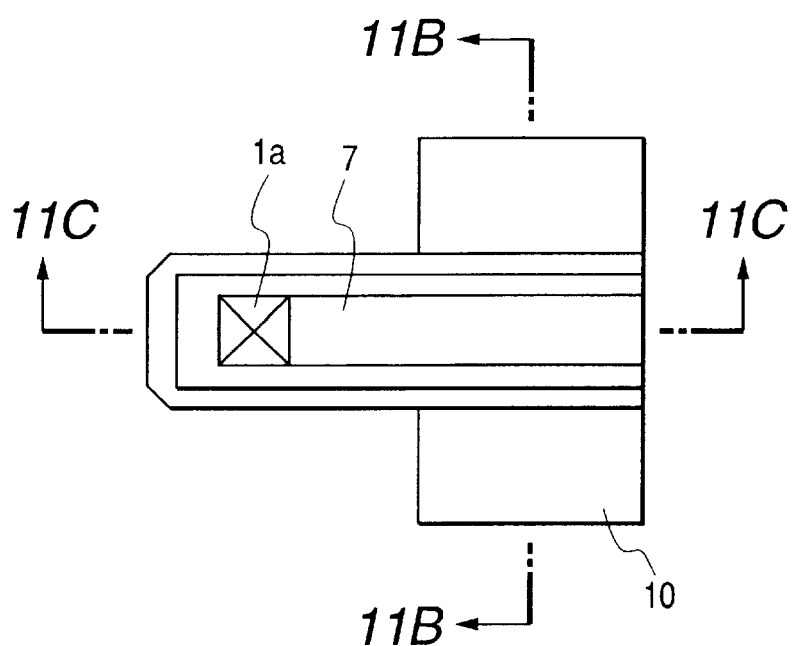
FIGS. 11A, 11B and 11C are diagrams showing the structure of a probe according to Embodiment 3 of the present invention.
Figure 11B:
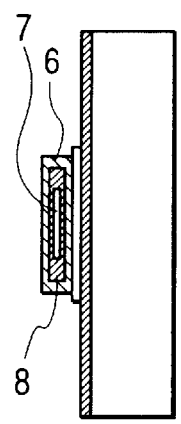
Figure 11C:
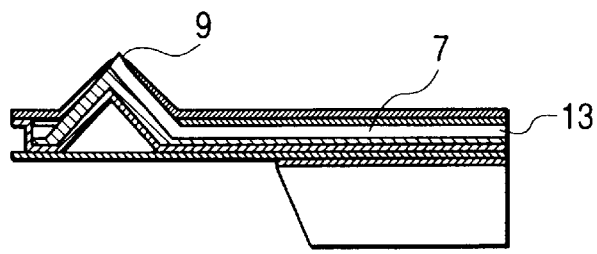

Next, by separating the first substrate 1 from the second substrate 10 at the interface between the separating layer 4 and the light-shielding layer A 6a, a probe structure comprising the light-shielding layers A and B (6a and 6b), the core layer 7, and the clad layers A and B (8a and 8b) was transferred onto the second substrate 10 (see FIG. 10B). In this case, since adhesion is poor at the interface between silicon dioxide of the separating layer 4 and gold of the light-shielding layer A 6a, the first substrate 1 can be separated easily. As a result, the portion corresponding to the recession of the first substrate became a protrusion 18 of a height of about 10 µm in the probe structure. Next, an optical micro-aperture 9 was formed in the same manner as in FIG. 6D (see FIG. 10C).

Next, a part of the second substrate 10 was etched off through the etching opening 12 using an aqueous solution of tetramethylammonium hydroxide heated to 90° C. (see FIG. 10D).

Next, the mask layer 11 was removed using a mixed solution of hydrogen fluoride and ammonium fluoride to form a cantilever 14. The cantilever 14 had a length of 3 mm, and a spring constant of 0.2 N/m. Finally, the second substrate 10 was cut with a diamond cutter to form the end 13 of the wave-guide (see FIG. 10E).

Although the process for manufacturing one probe was described above, a plurality of probes can be formed simultaneously on a substrate, thereby raising productivity. A multi-probe chip having a plurality of probes can also be formed.

According to this embodiment, there is provided a method for manufacturing an optical probe, in which productivity is high because of a batch process, the process reproducibility of optical micro-apertures is high, integration and down sizing are easily achieved, and a plurality of probes are easily fabricated. Also, since no optical coupling portion is required between the wave guide layer and the optical micro-aperture, a clad layer is present around the core layer, and the shape of the core layer is converged toward the optical micro-aperture, an optical prove of less transmission loss of light in the wave-guide compared with Examples 1 and 2 could be provided.

Embodiment 4

This embodiment is an AFM/SNOM composite apparatus in which a probe fabricated by the manufacturing method of the present invention was used as an evanescent light-emitting device. A block diagram of the apparatus is shown in FIG. 12. The apparatus is comprised of the following portions: the probe 100; a laser source 41 irradiating the reverse side of the free end of the cantilever of probe 100 with laser; a position sensor 43 detecting a change of an angle of reflection of the light by a displacement according to a distortion of the cantilever; a displacement-detecting circuit 46 detecting the displacement using a signal from the position sensor; an XYZ-axes driving piezo device 45; an XYZ-driver 47 driving the XYZ-axes driving piezo device in XYZ-directions; and a minute light detector 48 detecting light propagated from a surface of a sample 44 at which surface the evanescent light 42 oozing out from the micro-aperture is scattered. The AFM/SNOM composite apparatus made it possible to measure simultaneously both information about optical characteristics of the surface of the sample and information about shape of the surface of the sample. Further, although conventional hard probes are prone to be damaged by a contact with a sample, the construction of the present invention in which the probe is mounted on the cantilever makes it possible to suffer little damage. In addition, the observation of the optical information by the contact realized the SNOM apparatus requiring no feedback-controlling in Z-direction (e.g. the height direction).

According to the present invention, as described above, the probe can be formed, in which productivity is high because of a batch process, the process reproducibility of optical micro-apertures is high, integration and down sizing are easily achieved, and a plurality of probes are easily fabricated.

Furthermore, according to the present invention, since the probe can be formed on a compound semiconductor substrate such as gallium arsenide, the probe can be bonded easily with a light-emitting element such as a semiconductor laser. Furthermore, according to the present invention, there is also provided an optical probe that does not require a optical coupling portion between the wave guide layer and the optical micro-aperture, and has little transmission loss of light.

What is claimed is:

1. A method for manufacturing a cantilever-type probe for irradiating with or detecting light having a protrusion that has an optical micro-aperture and a wave guide layer, which comprises the steps of forming the protrusion and the wave guide layer integrally on one substrate, and transferring the integrally formed protrusion and wave guide layer to another substrate.

2. The method according to claim 1, wherein the former substrate, or the first substrate is a single-crystalline silicon substrate.

3. The method according to claim 1, wherein the wave guide layer is a single layer.

4. The method according to claim 1, wherein the wave guide layer is comprised of a core layer and a clad layer that covers the core layer.

5. The method according to claim 1, wherein the other substrate or the second substrate is a single-crystalline silicon substrate.

6. The method according to claim 1, wherein the other substrate or the second substrate is a compound semiconductor substrate.

7. The method according to claim 1, which further comprises the step of forming a light coupler for optically coupling the wave guide layer to the exterior.

8. The method according to claim 7, wherein the light coupler is formed by processing a part of the surface of the first substrate.

9. A method for manufacturing a probe for irradiating with or detecting light, which comprises the steps of:
(a) forming at least one recession on a first substrate;
(b) fabricating a probe structure that contains a wave guide layer on the first substrate having the recession;
(c) bonding the probe structure onto a second substrate;
(d) transferring the probe structure that has a protrusion onto the second substrate, by peeling the probe structure off the first substrate; and
(e) forming a cantilever-type probe that has a protrusion on a free end thereof by removing a part of the second substrate.

10. The method according to claim 9, wherein the step (b) further comprises the step of forming a light-shielding layer for shielding at least a part of the wave guide layer.

11. The method according to claim 10, further comprising a step of removing the light-shielding layer formed on a tip region of the protrusion to form an optical micro-aperture.

12. The method according to claim 9, wherein a light-shielding layer for shielding at least a part of the wave guide layer is formed after the step (d).

13. The method according to claim 12, further comprising a step of removing the light-shielding layer formed on a tip region of the protrusion to form an optical micro-aperture.

14. The method according to claim 9, wherein the former substrate, or the first substrate is a single-crystalline silicon substrate.

15. The method according to claim 9, wherein the recession is formed by crystal-anisotropic etching.

16. The method according to claim 9, wherein the wave guide layer is a single layer.

17. The method according to claim 9, wherein the wave guide layer is comprised of a core layer and a clad layer that covers the core layer.

18. The method according to claim 9, wherein the other substrate or the second substrate is a single-crystalline silicon substrate.

19. The method according to claim 9, wherein the other substrate or the second substrate is a compound semiconductor substrate.

20. The method according to claim 9, which further comprises the step of forming a light coupler for optically coupling the wave guide layer to the exterior.

21. The method according to claim 20, wherein the light coupler is formed by processing a part of the surface of the first substrate.

22. The method according to claim 9, wherein a light-emitting or light-receiving element that is bonded to the wave guide layer is formed on the second substrate.

23. The method according to claim 22, wherein the light-emitting element is a side light-emitting device.

24. The method according to claim 22, wherein the light-emitting element is a flat light-emitting device.

25. The method according to claim 9, wherein the protrusion is formed to be thicker in the vicinity of the shortest path that connects a tip region of the protrusion to the second substrate.

26. The method according to claim 9, wherein the wave guide layer is formed using a vacuum process in the step (b) by obliquely supplying a material which will become the wave guide layer to the first substrate.

27. A cantilever-type probe for irradiating with or detecting light having a protrusion that has an optical micro-aperture and a wave guide layer produced according to any of claims 1 or 9.

28. The probe according to claim 27, wherein the protrusion is hollow.

29. The probe according to claim 27, wherein at least a part of the wave guide layer is covered with a light-shielding layer.

30. The probe according to claim 29, wherein a light coupler for optically coupling the wave guide layer to the exterior is formed.

31. The probe according to claim 30, wherein the light coupler is a periodical structure formed on a part of the wave guide layer or the shielding layer.

32. The probe according to claim 27, wherein the optical micro-aperture is an opening for transmitting evanescent light.

33. The probe according to claim 27, wherein the wave guide layer is a single layer.

34. The probe according to claim 27, wherein the wave guide layer is comprised of a core layer and a clad layer that covers the core layer.

35. The probe according to claim 27, wherein the protrusion is formed to be thicker in the vicinity of the shortest path that connects a tip region of the protrusion to the second substrate.

36. The probe according to claim 27, wherein the probe has an end of the wave-guide where an end face of the wave guide layer is exposed.

37. The probe according to claim 27, wherein the probe has a surface of the wave-guide where a surface of the wave guide layer is exposed.

38. The probe according to claim 37, wherein the exposed surface of the wave-guide is formed on a surface opposite to a surface having the protrusion of the wave guide layer, and a through-hole is formed from the bottom surface of the substrate to the exposed surface of the wave-guide in the substrate that supports the cantilever.

39. The probe according to claim 27, wherein the wave guide layer is coupled to an optical fiber.

40. The probe according to claim 27, wherein the wave guide layer is coupled to a light-emitting element.

41. The probe according to claim 40, wherein the light-emitting element is a side light-emitting device.

42. The probe according to claim 40, wherein the light-emitting element is a surface light-emitting device formed on the substrate.

43. The probe according to claim 27, wherein the wave guide layer is coupled to a light-receiving element.

44. A surface-observing apparatus having the cantilever-type probe for irradiating with or detecting light according to claim 27.

45. A surface-observing apparatus having the cantilever-type probe for irradiating with or detecting light according to claim 28.

46. A surface-observing apparatus having the cantilever-type probe for irradiating with or detecting light according to claim 29.

47. A surface-observing apparatus having the cantilever-type probe for irradiating with or detecting light according to claim 30.

48. A surface-observing apparatus having the cantilever-type probe for irradiating with or detecting light according to claim 31.

49. A surface-observing apparatus having the cantilever-type probe for irradiating with or detecting light according to claim 32.

50. A surface-observing apparatus having the cantilever-type probe for irradiating with or detecting light according to claim 33.

51. A surface-observing apparatus having the cantilever-type probe for irradiating with or detecting light according to claim 34.

52. A surface-observing apparatus having the cantilever-type probe for irradiating with or detecting light according to claim 35.

53. A surface-observing apparatus having the cantilever-type probe for irradiating with or detecting light according to claim 36.

54. A surface-observing apparatus having the cantilever-type probe for irradiating with or detecting light according to claim 37.

55. A surface-observing apparatus having the cantilever-type probe for irradiating with or detecting light according to claim 38.

56. A surface-observing apparatus having the cantilever-type probe for irradiating with or detecting light according to claim 39.

57. A surface-observing apparatus having the cantilever-type probe for irradiating with or detecting light according to claim 40.

58. A surface-observing apparatus having the cantilever-type probe for irradiating with or detecting light according to claim 41.

59. A surface-observing apparatus having the cantilever-type probe for irradiating with or detecting light according to claim 42.

60. A surface-observing apparatus having the cantilever-type probe for irradiating with or detecting light according to claim 43.

* * * * *